US012522386B2

(12) United States Patent
Makovsky et al.

(10) Patent No.: US 12,522,386 B2
(45) Date of Patent: Jan. 13, 2026

(54) PNEUMATIC ADJUSTABLE LAUNCHER

(71) Applicants: Dalton J. Makovsky, Prentice, WI (US); Johnathon D. Garcia, King George, VA (US)

(72) Inventors: Dalton J. Makovsky, Prentice, WI (US); Johnathon D. Garcia, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/746,143

(22) Filed: Jun. 18, 2024

(65) Prior Publication Data

US 2025/0382076 A1 Dec. 18, 2025

(51) Int. Cl.
*B64U 70/50* (2023.01)

(52) U.S. Cl.
CPC .................................... *B64U 70/50* (2023.01)

(58) Field of Classification Search
CPC ........ B64U 70/00; B64U 70/50; B64U 70/70; F41B 11/00; F41B 11/70; F41B 11/80
See application file for complete search history.

(56) References Cited

U.S. PATENT DOCUMENTS 4,026,188 A * 5/1977 Woodruff ................ F42B 5/035 89/1.51
4,164,887 A * 8/1979 Ouellette .................. F41F 5/00 89/1.51
4,263,835 A * 4/1981 Dragonuk ............... F41B 11/00 89/1.51
4,733,597 A * 3/1988 Upham ................... F42B 12/58 89/1.51
5,092,221 A * 3/1992 Travor .................. B63B 22/003 89/1.51
6,820,606 B1 * 11/2004 Duffey .................... F41B 11/00 124/31
8,205,828 B2 * 6/2012 Bossert ...................... F41F 3/07 114/238
8,205,829 B2 * 6/2012 Bossert ...................... F41F 3/07 114/238
9,182,191 B2 * 11/2015 Gardner, Jr. ...... F16K 31/52475
11,814,165 B2 * 11/2023 Noskowicz ............ B64U 20/50
12,030,666 B2 * 7/2024 Kuperman ................ B64F 1/04
12,123,678 B2 * 10/2024 Guaraldo .................. F41F 3/08
2002/0083937 A1 * 7/2002 Fu .......................... A63H 37/00 124/57

(Continued)

FOREIGN PATENT DOCUMENTS

GB 118317 A * 8/1917 .............. F41B 11/00
GB 1321892 A * 7/1970 .............. F41B 11/00

*Primary Examiner* — Benjamin P Lee
(74) *Attorney, Agent, or Firm* — Gerhard W. Thielman

(57) ABSTRACT

A pneumatically powered launcher is provided for propelling a payload within an open ended envelope. The launcher includes a container, a valve mechanism and a firing mechanism. The container holds compressed gas and includes a release port. The valve mechanism transfers the gas from the container to the envelope as thrust against the payload. The valve mechanism includes a latch for maintaining close position by default. The latch is releasable to open position by actuation. The firing mechanism releases the latch on command.

7 Claims, 4 Drawing Sheets

(56) References Cited

U.S. PATENT DOCUMENTS

| | | | | |
|---|---|---|---|---|
| 2005/0274845 | A1* | 12/2005 | Miller | B64U 30/12 244/49 |
| 2010/0242939 | A1* | 9/2010 | Halmone | F41B 11/721 124/45 |
| 2011/0232618 | A1* | 9/2011 | Gabrel | F41B 11/723 124/73 |
| 2015/0316345 | A1* | 11/2015 | Brahler, II | F41B 11/60 124/73 |
| 2016/0054097 | A1* | 2/2016 | Sylvia | B64U 70/20 124/56 |
| 2016/0347476 | A1* | 12/2016 | Andryukov | B64U 30/12 |
| 2018/0244402 | A1* | 8/2018 | Kahlon | B64F 1/04 |
| 2020/0079492 | A1* | 3/2020 | Noskowicz | B64U 10/25 |
| 2022/0348355 | A1* | 11/2022 | Kuperman | B64C 39/024 |
| 2024/0060745 | A1* | 2/2024 | Gardner, Jr. | F41B 11/721 |

* cited by examiner

PNEUMATIC ADJUSTABLE LAUNCHER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to payload launchers from tubes. In particular, the invention relates to launchers that employ pneumatic propulsion.

Unmanned aerial vehicle (UAV) producers in the commercial sector each have their own design for either a pneumatic or gas generator launch tube to deploy UAVs. These are tailored to each specific UAV arrangement and don't offer the adjustability required to launch UAVs of various mass, size, or configuration. The pneumatic version of these launchers requires large air tanks to provide necessary launch accelerations due to the use of standard commercially available valve designs.

These conventional valves limit how quickly a volume of air can be expelled from the pressure vessel resulting in either a higher required initial tank pressure or larger air volume. On the other hand, gas generators are reliable pressure sources for launching payloads, although they aren't tunable systems. A new gas generator must be designed, or multiple gas generators must be added and/or removed from a launcher to increase or decrease launch pressures. Gas generators constitute pyrotechnic devices, which require special operational considerations and handling procedures versus purely pneumatic systems.

SUMMARY

Conventional payload launchers yield disadvantages addressed by various exemplary embodiments of the present invention. In particular, various exemplary embodiments provide a pneumatically powered launcher for propelling a payload within an open ended envelope. The launcher includes a container, a valve mechanism and a firing mechanism. The container holds compressed gas and includes a release port. The valve mechanism transfers the gas from the container to the envelope as thrust against the payload. The valve mechanism includes a latch for maintaining close position by default. The latch is releasable to open position by actuation. The firing mechanism releases the latch on command.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches ("), mass in grams (g), time in seconds(s), angles in degrees) (°, force in newtons (N) or pounds-force ($lb_f$), temperature in kelvins (K), energy in joules (J) and frequencies in hertz (Hz). Supplemental measures can be derived from these, such as pressure in pounds-per-square-inch (psi), density in grams-per-cubic-centimeters ($g/cm^3$), moment of inertia in gram-square-centimeters ($kg\text{-}m^2$) and the like.

The purpose of the Pneumatic Adjustable Launcher is to provide a means for deploying an unmanned aerial vehicle (UAV) and various additional payloads using a tunable high pressure air tank and quick release valve.

Figure 1A:
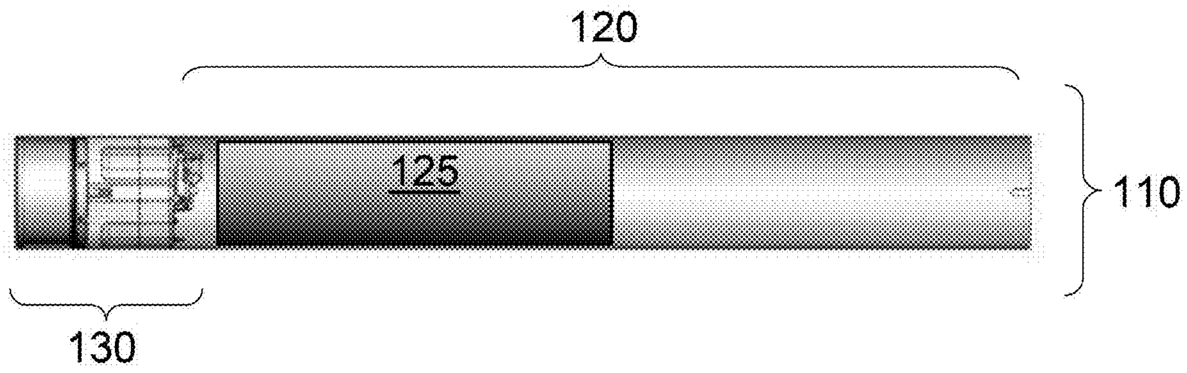
FIG. 1A is an elevation cross-section view of a pneumatic adjustable launcher.
Figure 1B:
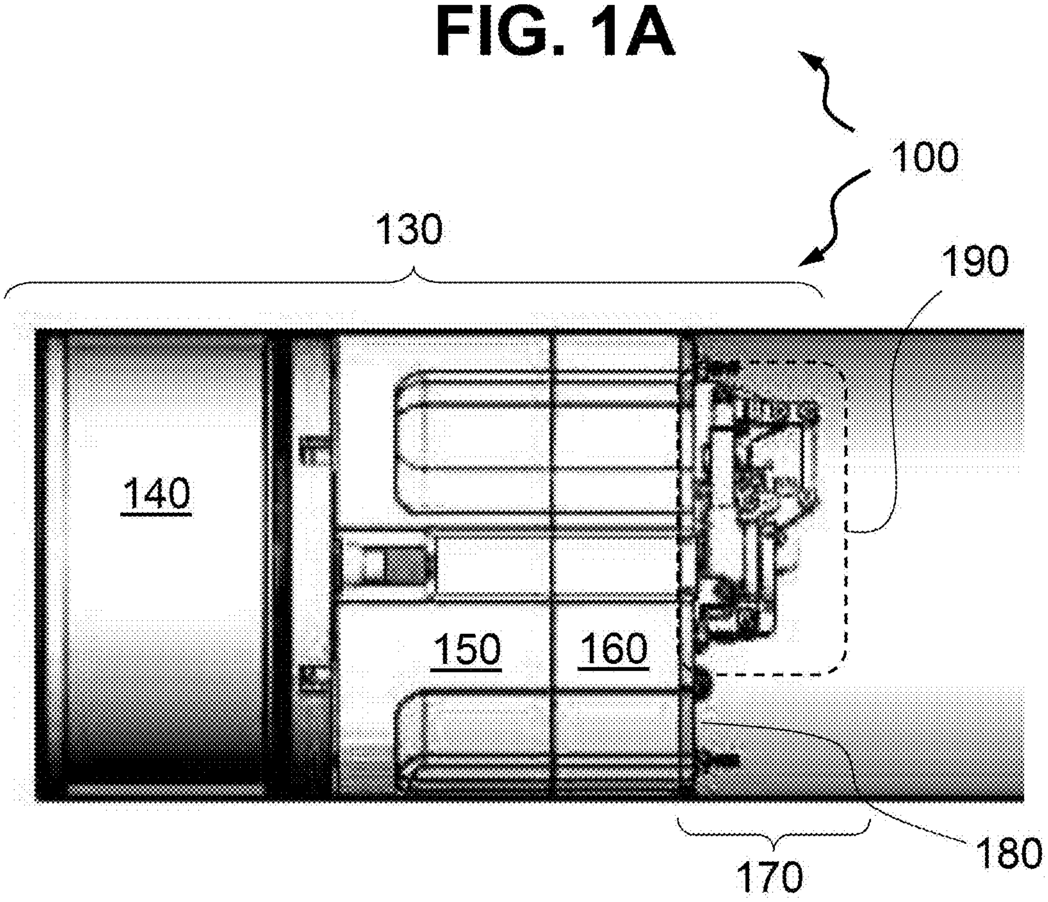
FIG. 1B is a detail elevation view of a booster section.

FIGS. 1A and 1B show elevation views 100 of an exemplary pneumatic adjustable launcher (PAL) 110. FIG. 1A presents a fiberglass launch tube 120 for containing a payload 125 and attaching to a booster section 130 that accelerates the payload 125. The tube 120 represents an example canister or open envelope that contains the payload 125 for accelerated expulsion. The payload 125 can, for example, be a UAV. FIG. 1B provides details of the booster section 130 that includes an aft platform 140, aft and fore dunnage 150 and 160, and actuator module 170. An attach plate 180 and an armature 190 comprise the module 170. The PAL 110 has an adjustable pressure range from 0 psi to 4500 psi.

Figure 2:
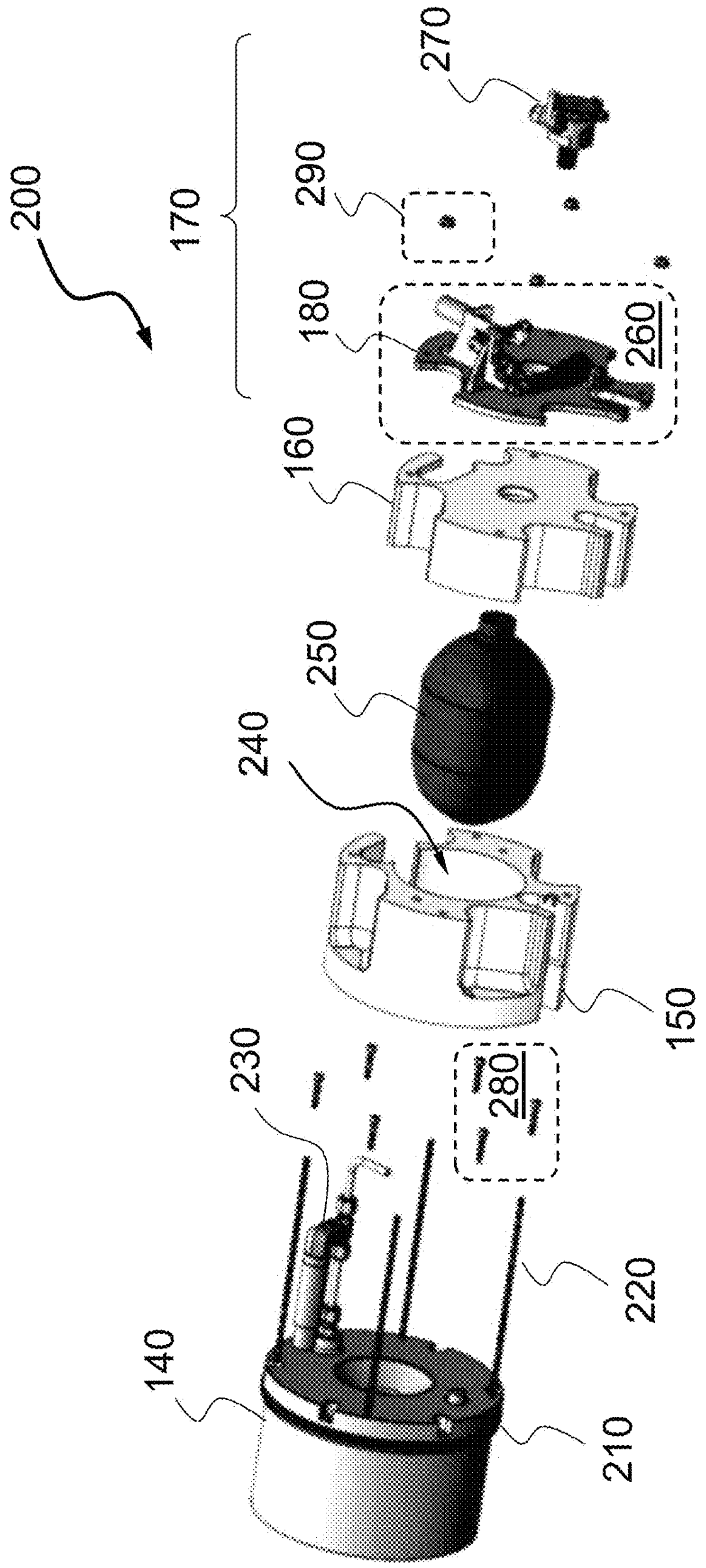
FIG. 2 is an isometric exploded view of booster components.

FIG. 2 shows an isometric view 200 of the booster section 130. The aft platform 140 includes a thrust plate 210 that secures four circumferential alignment rods 220 and supports a fill valve 230. The aft dunnage 150 includes a cavity 240 that contains a pressurized gas bottle 250 held by the fore dunnage 160. The armature 190 in the module 170 includes a firing mechanism 260 disposed on the plate 180 and a valve assembly 270. These armature components are secured by a set of bolts 280 and corresponding nuts 290 as fasteners.

The bottle 250 can contain compressed air or other appropriate (i.e., non-flammable) gas for pressurization of the tube 120 and includes male threads at the fore end to engage the plate 180, sealed by an o-ring. The firing mechanism 260 quickly operates the valve assembly 270 to release the gas in the bottle 250 with which to rapidly accelerate the payload 125.

In the configuration shown, the bottle 250 can be a pressurized container or tank with circular cross-section. Artisans of ordinary skill will recognize that alternative embodiments with non-axisymmetric geometries can be envisioned for the tube 120, platform 140, and other components without departing from the scope of the invention.

The thrust plate 210 represents a mechanical stop to preclude rearward motion by the payload 125 and/or the module 170 from forces by the booster section 130. The four threaded rods 220 preload the entire launcher assembly 130 against the thrust plate 210, which includes two bulkhead penetrations, one of which is a port for the fill line 230, the other penetration for a wire harness connector. The fill line 230 extends from the thrust plate 210 to the valve assembly 270.

Figure 3:
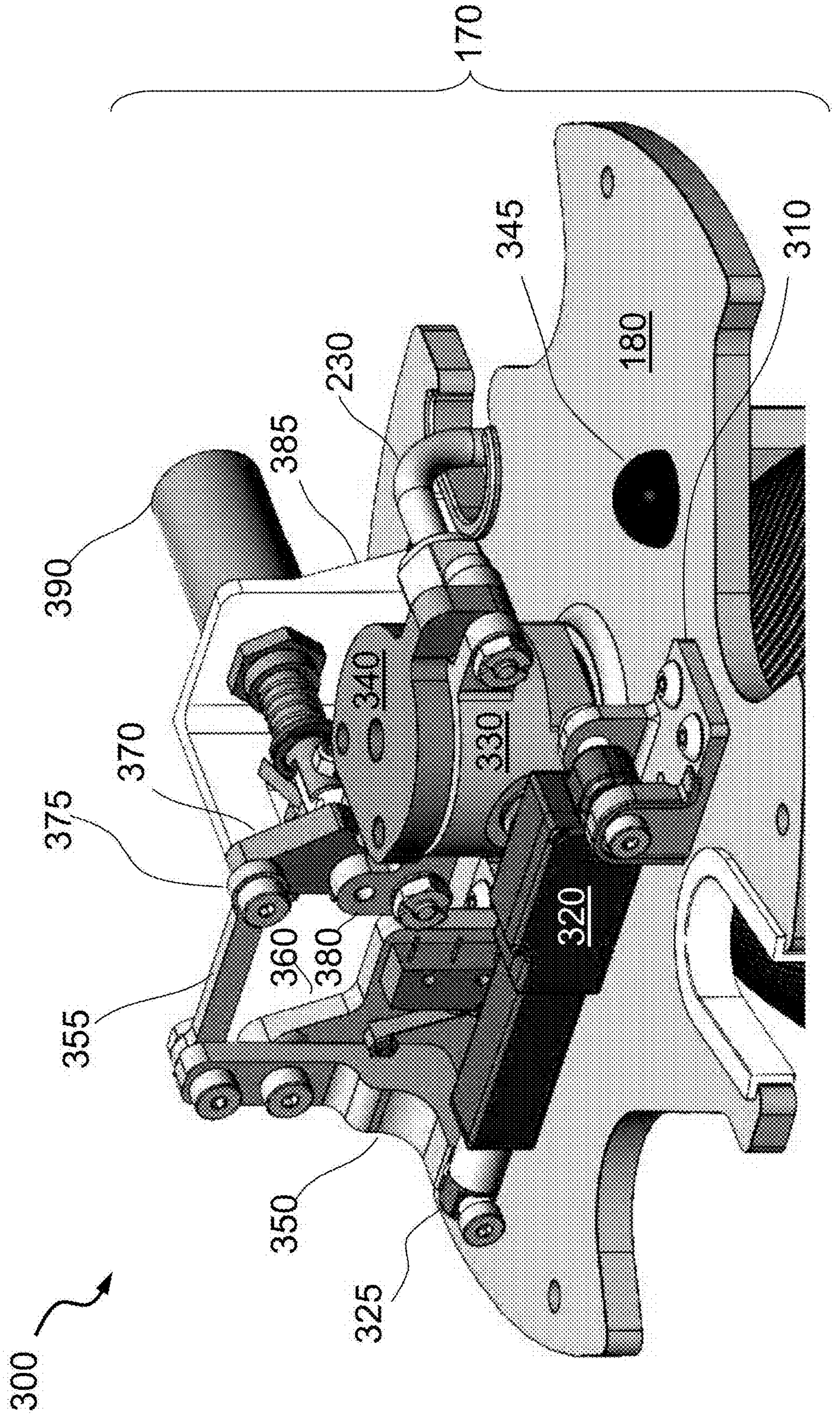
FIG. 3 is an isometric detail view of an actuator mechanism.

FIG. 3 shows an isometric view 300 of the module 170 atop the plate 180. Components include mount bracket 310, linear servo actuator 320 with an end connector 325, valve 330, plug retainer 340, elastic bumper button 345, firing linkage 350 (or firing link), rocking armature 355, mount 360, firing sear 370 attaching to a hinge 375, sear linkage 380 (or sear link), bracket 385 and safety solenoid 390. The actuator 320 operates in response to a pulse-width modulation (PWM) signal and receives 28V potential to provide electric power. Opening the valve mechanism 270 depends on interaction between the connector 325 and the hinge 375 as respective first and second ends between the actuator 320 and the sear 370.

Figure 4:
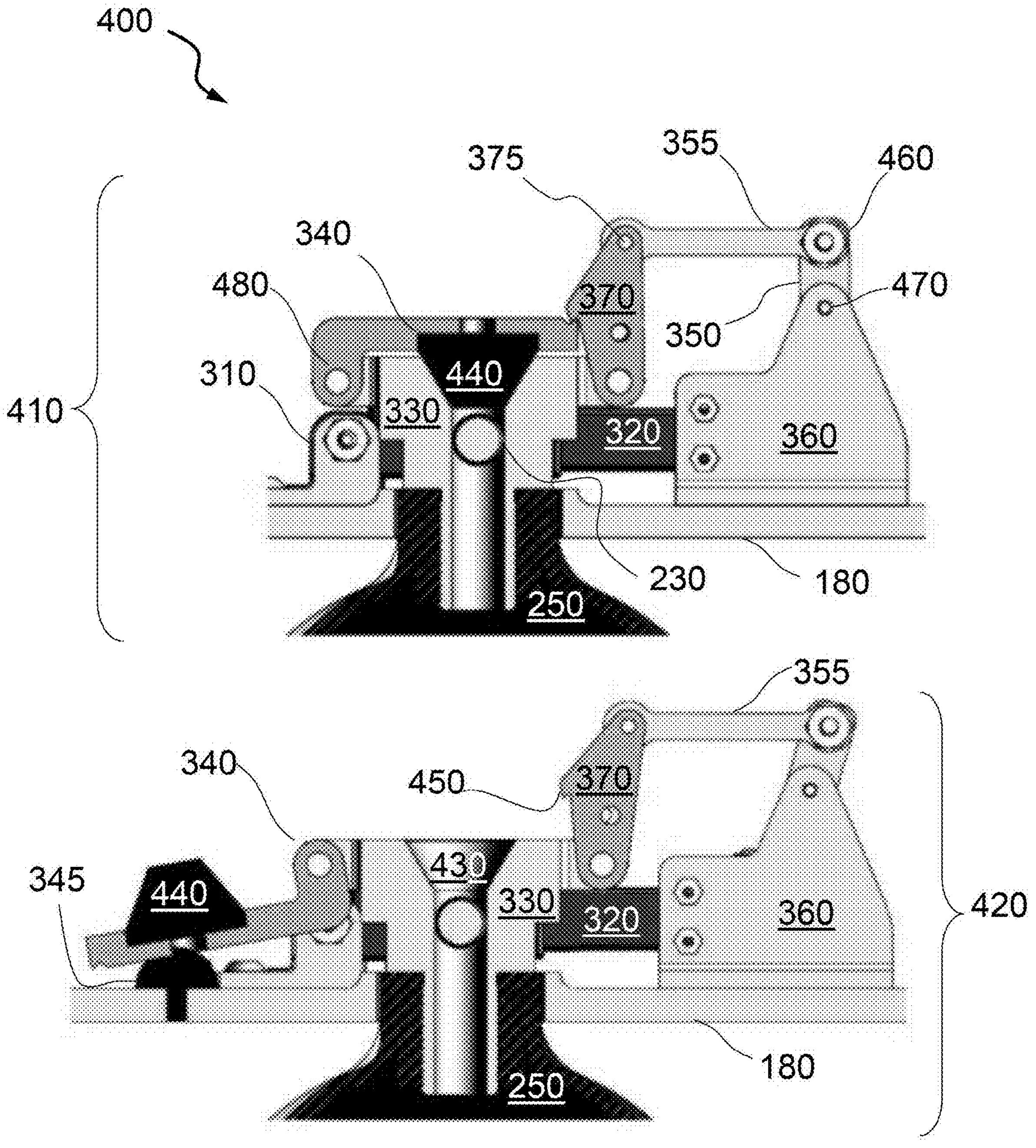
FIG. 4 is a pair of elevation views of the actuator mechanism.

FIG. 4 shows elevation views 400 of the armature 190 in close 410 and open 420 positions. The valve 330 includes a chamfer opening 430 that receives a silicone plug 440 embedded to the retainer 340. The sear 370 includes an escapement pallet 450 that latches the retainer 340 to maintain the valve 330 closed. The actuator 320 pulls the linkage 350 at connector 325 on command to pull the hinge 375 and yank the pallet 450, which acts as a ratchet.

Pulling the armature 355 by pivoting the linkage 350 at hinges 460 and 470 unlatches the pallet 450. Pressure from the gas bottle 250 at its release port pushes the plug 440 from the opening 430 and swings the retainer 340 that pivots on the joint 480 to open the valve 330. The retainer 340 impinges on the button 345 to avoid striking the plate 180 that could damage the retainer 340 after repeated actuations.

Exemplary components can have the following material characteristics. The bottle 250 containing compressed gas can be filament-wound carbon fiber, comparable to bottles used in paintball sports or for self-contained underwater breathing apparatus (SCUBA). The plate 180, linkage 360, mount 380 and bracket 385 comprise aluminum alloy 6061-T6. The valve 330, pivot bracket 360, linkage 350 and armature 355 are composed of aluminum alloy 7050-T7451. The mount bracket 310 for the solenoid 320 can be ABS plastic. The rods 220 and fill line 230 can be 316 stainless steel. The sear 370 and the plug retainer 340 are composed of maraging steel.

The PAL 110 comprises the booster section 130 and the launch tube 120 as seen in view 100. The payload 125 resides in the launch tube 120 forward of the launcher section 130. The entire PAL assembly 110 is fixed either at the end closest to the booster section 130 with a bolt pattern 280 or via bonded rings along the tube's length. The length of the tube 120 can be altered to accompany longer, shorter, or even multiple payloads 125.

The booster section 130 includes several key features including the valve assembly 270, firing mechanism 260, dunnage 150 and 160, carbon fiber gas bottle 250, the fill line 230 with pressure transducer, and the thrust plate 210. View 200 shows an exploded view of these components. The core of the booster section 230 is roughly 9.5" long.

The fill port 230 on the tubing has an integrated one-way valve for pressurization. Solid plastic dunnage 150 and 160 is used to reduce the ullage volume that the pressure fills once the tank valve opens. This dunnage 150 and 160 has integrated cableways, and its geometry conforms around the gas bottle 250 to maintain axial alignment when preloaded against the thrust plate 210. The bottle 250 is wound from carbon fiber and internally rated to 4500 psi.

A valve assembly 270 screws into the existing threads of the gas bottle 250 and uses an O-ring to seal that interface. The fill line 230 enters the valve body on the side of the safety solenoid 290 and a burst disk is inserted on the opposite side that bursts in the event of over-pressurization. The valve assembly 270 includes the plug retainer 340 with the embedded silicone plug 440, which seals the bottle 250 until the firing sear 370 unlatches. Two screws in the top of the retainer 340 compress the plug 440 when latching the sear 370.

A safety solenoid 390 is used to mechanically interrupt the firing sear 370 from actuation without proper command. The safety solenoid 390 has two limit switches that, upon activation, provide a sense signal. This signifies that the solenoid 390 has been pulled and closes the circuit to apply power to the linear actuator 320.

A signal is sent to the linear actuator 320 in response to pulling the safety solenoid 390 for activation. This pulls the firing linkage 350 and thereby unlatches the firing sear 370 of the firing mechanism 260. Pressure from the bottle 250 opens the plug retainer 340 of the valve assembly 270 to launch the payload 120 from the tube 110. A limit switch on the linear actuator linkage 350 provides a signal denoting full activation of the linear actuator 320.

The advantages of exemplary embodiments lie in its speed, ability to launch payloads 125 of varying size, shape, and mass, and its simplicity. The silicone plug 440 used in this design enables a rapid expulsion of its compressed gas charge over designs using commercial off-the-shelf (COTS) valves. COTS valves require the use of a solenoid or actuator to physically open the valve.

This inherently limits the valve's opening speed resulting in a slower buildup of pressure behind a payload and decreasing the payload's acceleration potential. By contrast in the exemplary pneumatic adjustable launcher (PAL) 110, the valve 330 is rapidly forced open by the pressure within the bottle 250 resulting in a more rapid opening sequence. The PAL 110 can adjust release pressure to accommodate a wide range of payload masses and exit velocities using a pressure regulator.

Alternative pressurized tanks can replace the bottle 250. Alternative embodiments can employ replacements to the firing sear 370 and plug retainer 350 could be replaced to a rotary sear such that the linear actuator 320 and linkage assembly be swapped with a servo and gear-set to release the plug retainer 340. A variety of other compressed gases could be used in place of compressed air for a steadier pressure at varying operating temperatures. The launcher 110 is currently optimized for use in a cylindrical launch tube 120. The launcher 110 can be adapted to other canister sizes or shapes and is scalable.

Commercially, there are many tube-launched UAVs starting to hit the market. The exemplary launcher 110 is payload agnostic and can be adaptable to several of these new UAVs. This launcher 110 can alternatively be used for cargo deployment. The launcher 110 can be mounted to surface or aerial platforms to deploy logistics and cargo payloads 120.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A pneumatically powered launcher for propelling a payload within an open ended envelope, said launcher comprising:

a container for holding compressed gas, said container including a release port;

a valve mechanism for transferring said gas from said container to the envelope as thrust against the payload, said valve mechanism having a latch for maintaining close position by default, said latch being releasable for open position by actuation, wherein said valve mechanism further comprises:

a flexible plug receivable by said port in said close position;

an armature retainer for securing said plug; and a hinge for pivoting said retainer from said close position to said open position upon activation of said firing mechanism; and a firing mechanism for releasing said latch on command, wherein said latch further includes:

a sear with an escapement for engaging said valve mechanism in said close position;

a release linkage having first and second ends, said first end pivoting said sear in response to translation of said second end; and a servo actuator for translating said second end of said release linkage.

2. The launcher according to claim 1, further including dunnage to restrain said container within the envelope.

3. The launcher according to claim 1, further including a thrust backstop for inhibiting rearward movement of said valve and firing mechanisms.

4. The launcher according to claim 1, wherein said release linkage further includes:

a sear link pivotably connecting to said sear at said first end;

a firing link pivotably connecting to said servo actuator at said second end; and a rocking armature pivotably connecting to said sear link opposite said first end and to said firing link opposite said second end, wherein responsive to said servo actuator, said rocking armature translates to pull said sear link, thereby pivoting said sear to release said escapement from said retainer.

5. The launcher according to claim 1, further including a thrust backstop for inhibiting rearward movement of said valve and firing mechanisms.

6. The launcher according to claim 5, wherein said valve mechanism further includes a bumper button disposed on said thrust backstop.

7. The launcher according to claim 1, wherein said container is a carbon fiber filament wound bottle.

* * * * *